United States Patent
Liang et al.

(10) Patent No.: US 11,763,264 B2
(45) Date of Patent: Sep. 19, 2023

(54) DYNAMIC SLOTTING USING BLENDING MODEL

(71) Applicant: Microsoft Technology Licensing, LLC, Redmond, WA (US)

(72) Inventors: Keqing Liang, Cupertino, CA (US); Giorgio Paolo Martini, Redwood City, CA (US); Shan Zhou, Cupertino, CA (US); Linda Fayad, San Francisco, CA (US); Wen Pu, Santa Clara, CA (US); Austin Qingfeng Lu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 17/486,577

(22) Filed: Sep. 27, 2021

(65) Prior Publication Data

US 2023/0095289 A1    Mar. 30, 2023

(51) Int. Cl.
G06Q 10/1053    (2023.01)
G06F 3/14    (2006.01)
G06N 5/022    (2023.01)
G06F 16/2457    (2019.01)

(52) U.S. Cl.
CPC ........... *G06Q 10/1053* (2013.01); *G06F 3/14* (2013.01); *G06F 16/24578* (2019.01); *G06N 5/022* (2013.01)

(58) Field of Classification Search
CPC . G06Q 10/1053; G06F 3/14; G06F 16/24578; G06N 5/022
See application file for complete search history.

(56) References Cited

U.S. PATENT DOCUMENTS

| 10,387,910 B2 | 8/2019 | Gao et al. |
| 10,565,622 B1 | 2/2020 | Burstein et al. |
| 10,839,100 B2 | 11/2020 | Hollinger et al. |
| 10,922,722 B2 | 2/2021 | Cetintas et al. |
| 10,951,676 B2 | 3/2021 | Yan et al. |

(Continued)

OTHER PUBLICATIONS

"Notice of Allowance Issued in U.S. Appl. No. 16/588,485", dated Sep. 15, 2021, 12 Pages.

(Continued)

*Primary Examiner* — Florian M Zeender
*Assistant Examiner* — Karma A El-Chanti
(74) *Attorney, Agent, or Firm* — Schwegman, Lundberg & Woessner, P.A.

(57) ABSTRACT

Sponsored and organic pieces of content are displayed in accordance with a blending model that is used to first identify a pattern of slots to which to assign either sponsored or organic pieces of content. This blending model is applied to a combination of both sponsored and non-sponsored pieces of content being considered for display to a user. This pattern only determines the slot assignments. The actual ranking of the pieces of content, and more particularly the actual ranking of the organic pieces of content, is determined by an ordering other than the ranking determined by the blending model, such as by using the original ordering of the second list. The pieces of content are then displayed in the order of this actual ranking, but in the slots indicated as having been assigned to be either sponsored or organic in the pattern determined by the blending model.

19 Claims, 7 Drawing Sheets

(56) References Cited

U.S. PATENT DOCUMENTS

| | | |
|---|---|---|
| 2011/0153421 A1 | 6/2011 | Novikov et al. |
| 2014/0101685 A1 | 4/2014 | Kitts et al. |
| 2015/0095154 A1* | 4/2015 | Kannan .................. G06Q 50/01 |
| | | 705/14.55 |
| 2016/0358229 A1* | 12/2016 | Bhalgat .................. G06Q 50/01 |
| 2018/0300335 A1 | 10/2018 | Drochomirecki et al. |
| 2019/0043017 A1* | 2/2019 | Grover .................. G06F 16/248 |
| 2019/0147041 A1* | 5/2019 | Dey ....................... G06F 40/117 |
| | | 704/9 |
| 2019/0197398 A1* | 6/2019 | Jamali ....................... G06N 3/08 |
| 2020/0065772 A1* | 2/2020 | Whitehead ......... G06Q 10/1053 |
| 2020/0302477 A1* | 9/2020 | Liang ..................... G06Q 10/04 |
| 2021/0097126 A1 | 4/2021 | Martini et al. |
| 2021/0382952 A1* | 12/2021 | Yates .................. G06F 16/9577 |

OTHER PUBLICATIONS

"Non-Final Office Action Issued in U.S. Appl. No. 16/588,485", dated Apr. 21, 2021, 17 Pages.

* cited by examiner

DYNAMIC SLOTTING USING BLENDING MODEL

TECHNICAL FIELD

The present disclosure generally relates to technical problems encountered in determining content to display in large computer networks. More specifically, the present disclosure relates to dynamic slotting of content items using a blending model.

BACKGROUND

The rise of the Internet has occasioned two disparate yet related phenomena: the increase in the presence of online networks, such as social networking services, with their corresponding user profiles visible to large numbers of people, and the increase in the use of these online networking services to provide content. An example of such content is job listing content. Here, job listings are posted to a social networking service and these job listings are presented to users of the social networking service, either as results of job searches performed by the users in the social networking service, or as unsolicited content presented to users in various other channels of the social networking service.

The online network typically will charge the entities that post certain types of content, such as job listings (e.g., companies, recruiting firms, etc.) a fee for posting the content and for having the content be displayed in a more prominent position (e.g., higher in a list) than it would have been displayed if no fee had been charged. In some circumstances the charge for the content is an ongoing fee based on the number of users who view the content. More particularly, in some circumstances it is beneficial to allow companies to pay for "sponsored" content, which is surfaced to users in contexts within the graphical user interfaces of the online network in which it would not have ordinarily been seen, and to mix these sponsored pieces of content with non-sponsored pieces of content (also called "organic" content). It should be noted that while non-sponsored pieces of content may commonly be "free" in that the poster is not charged for either posting the content or for displaying the content more prominently, it is possible for a piece of content to be non-sponsored while there still being a fee involved, such as if a fee is charged for every job listing that is posted (e.g., all organic pieces of content have fees) and job posters may elect to pay an additional fee to sponsor the piece of content in order to display the content more prominent.

Coordinating displaying the sponsored pieces of content within the organic pieces of content can create numerous technical challenges with respect to how and how often the sponsored pieces of content should be displayed.

One solution is to provide fixed slotting. In fixed slotting, the portion of a user interface designed to display the pieces of content is split into various fixed slots. Some of the slots are assigned to sponsored pieces of content and some of the slots are assigned to organic pieces of content. For example, for a user interface with 15 possible slots in which to display pieces of content, the first three may be set aside specifically for sponsored pieces of content, the next eight may be set aside specifically for organic pieces of content, and the last four may be set aside specifically for sponsored pieces of content.

Such a fixed approach, however, is suboptimal. Different users have different reactions to the presentation of sponsored pieces of content as well as to where the sponsored pieces of content are presented. One user may respond well to having a sponsored piece of content in a first slot while another user may respond poorly, but may respond well if the sponsored piece of content was in the middle of the slots. Additionally, depending on the pieces of content involved, there may be circumstances where the number of sponsored pieces of content that the user is likely to engage with is low. In such cases, it may be more beneficial to devote more slots to organic pieces of content that the user is likely to engage with rather than fill fixed slots with sponsored pieces of content that the user is unlikely to engage with.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
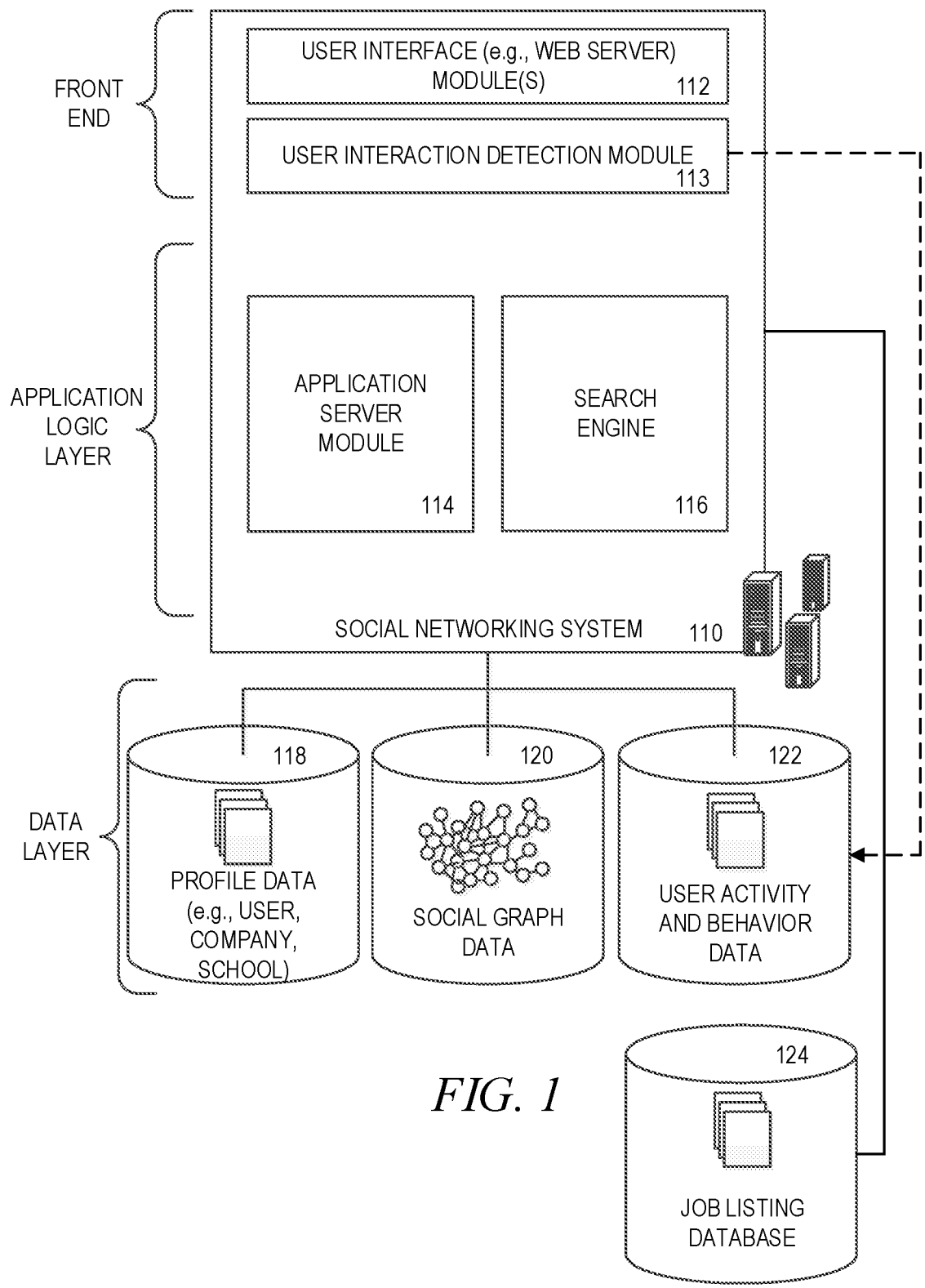
FIG. 1 is a block diagram showing the functional components of a social networking service, including a data processing module referred to herein as a search engine, for use in generating and providing search results for a search query, consistent with some embodiments of the present disclosure.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, sponsored and organic pieces of content are displayed in accordance with a blending model that is used to first identify a pattern of slots to which to assign either sponsored or organic pieces of content. This blending model is applied to a combination of both sponsored and organic pieces of content being considered for display to a user. Thus, for example, a first list of sponsored pieces of content to display and a second list of organic pieces of content to display are received. Each of these lists may be ordered in accordance with some earlier-applied ranking model.

The lists may be merged into a single merged list, and any duplicates may then be removed. The merged list may then be ranked using the blending model. The blending model may utilize a predicted click-through rate (or other measure of engagement) for each piece of content, as determined by an engagement model. This predicted click-through rate may then be multiplied by a bid. In the case of sponsored pieces of content, the bid may be a reflection of the value the sponsor is agreeing to provide in exchange for a single impression of the corresponding sponsored piece of content. In the case of organic pieces of content, the bid may be a shadow bid, which is reflective of the "value" of the impression of the corresponding organic piece of content to the entity controlling the display of the pieces of content (e.g., a social networking service). This value may be determined in a number of ways, which will be described in more detail below.

The blending model may also apply one or more constraints to the pattern it is determining. Effectively, the blending model ranks all of the pieces of content (including both sponsored and organic pieces of content) using the click-through rate and bid, but conditions the ranking on the one or more constraints being met. Thus the ranking from using the click-through rate and bid is modified to meet the constraints.

Once the blending model has identified a ranking that meets all the constraints, this ranking is used to determine the pattern of content displayed within the slots. Notably, rather than actually using the ranking itself as the exact ordering in which the pieces of content are displayed, the ranking is only used to determine the pattern for which slots are assigned to either sponsored or organic pieces of content. Thus, for example, if there are 15 slots in a user interface to display pieces of content, and the top 15 results in the ranking are such that first 3 pieces of content are organic, the next 2 pieces of content are sponsored, the next 3 pieces of content are organic, the next piece of content is sponsored, the next 2 pieces of content are organic, the next 2 pieces of content are sponsored, and the final piece of content is organic. Then the pattern would be 3 organic, 2 sponsored, 3 organic, 1 sponsored, 2 organic, 2 sponsored, 1 organic.

This pattern only determines the slot assignments. The actual ranking of the pieces of content, and more particularly the actual ranking of the organic pieces of content, is determined by an ordering other than the ranking determined by the blending model, such as by using the original ordering of the second list. The pieces of content are then displayed in the order of this actual ranking, but in the slots indicated as having been assigned to be either sponsored or organic in the pattern determined by the blending model.
Description The disclosed embodiments provide a method, apparatus, and system for performing dynamic slotting of content impressions, and specifically dynamically determining a pattern for the slotting using a blending model, and then separately determining an order for display within the pattern using something other than the blending model. It should be noted that for ease of understanding, a particular type of content, specifically job listings, will be described in detail in this disclosure. Nothing in this disclosure shall be read, however, as specifically limiting implementation of the techniques described herein to job listings, and the claims shall not be interpreted as being limited to job listings unless explicitly stated.

In an example embodiment, sponsored pieces of content are posted within an online network such as a social networking service. Each sponsored piece of content is associated with a daily and/or other time-based budget that is spent as users are provided with impressions of the piece of content. An impression may be considered to be a display of the sponsored piece of content in a manner that causes a charge to be incurred. In an example embodiment, displaying a sponsored piece of content in a list of pieces of content is considered to be an impression, while subsequent interactions the user has with the sponsored piece of content are called "interactions". In the case of job listings, these subsequent interactions may include clicking on the job listing to view the job listing in more detail, applying to the job listing, and/or performing other actions related to the job listing. As a result, prices for sponsored pieces of content may be dynamically adjusted so that a daily budget, set by an entity posting the sponsored piece of content, can be consumed over the course of the day instead of running out too early and/or failing to be used up by the end of the day. Additionally, prices for sponsored content impressions may also be dynamically adjusted to improve application rates, applicant quality, and/or other performance factors related to the sponsored pieces of content.

The poster of a sponsored piece of content may set daily budgets for the sponsored content, from which costs are deducted as the users view the pieces of content.

The price for each impression of a sponsored piece of content is known as the bid. While this bid may be adjusted based on numerous factors, the blending model uses the finalized bid in determining a pattern for dynamic slotting for a particular user and/or device. For organic pieces of content, these items do not have a bid in a traditional sense as no entity is paying specifically for displaying an impression of the corresponding piece of content, and thus a shadow bid is assigned by the social networking system 210 to these organic pieces of content. Details of how the shadow bid is assigned are discussed later in this document.

The resultant ranking determined by the blending model is used as a pattern of distribution of slots, and more particularly in determining whether to assign a slot to a sponsored piece of content or an organic piece of content. Notably, the actual display of the pieces of content is not exactly reflective of the ranking determined by the blending, as at least the organic pieces of content are reranked so that they are actually displayed in an order different than that output by the blending model, such as in the order they were received originally using a separate ranking model.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based API requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 1, by the user activity and behavior database 122. This logged activity information may then be used by the search engine 116 to determine search results for a search query.

Although not shown, in some embodiments, the social networking system 110 provides an API module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

As described above, example embodiments may be utilized for ranking and/or selection of job listings. These job listings may posted by job poster (entities that perform the posting, such as businesses) and stored in job listing database 124.

Figure 2:
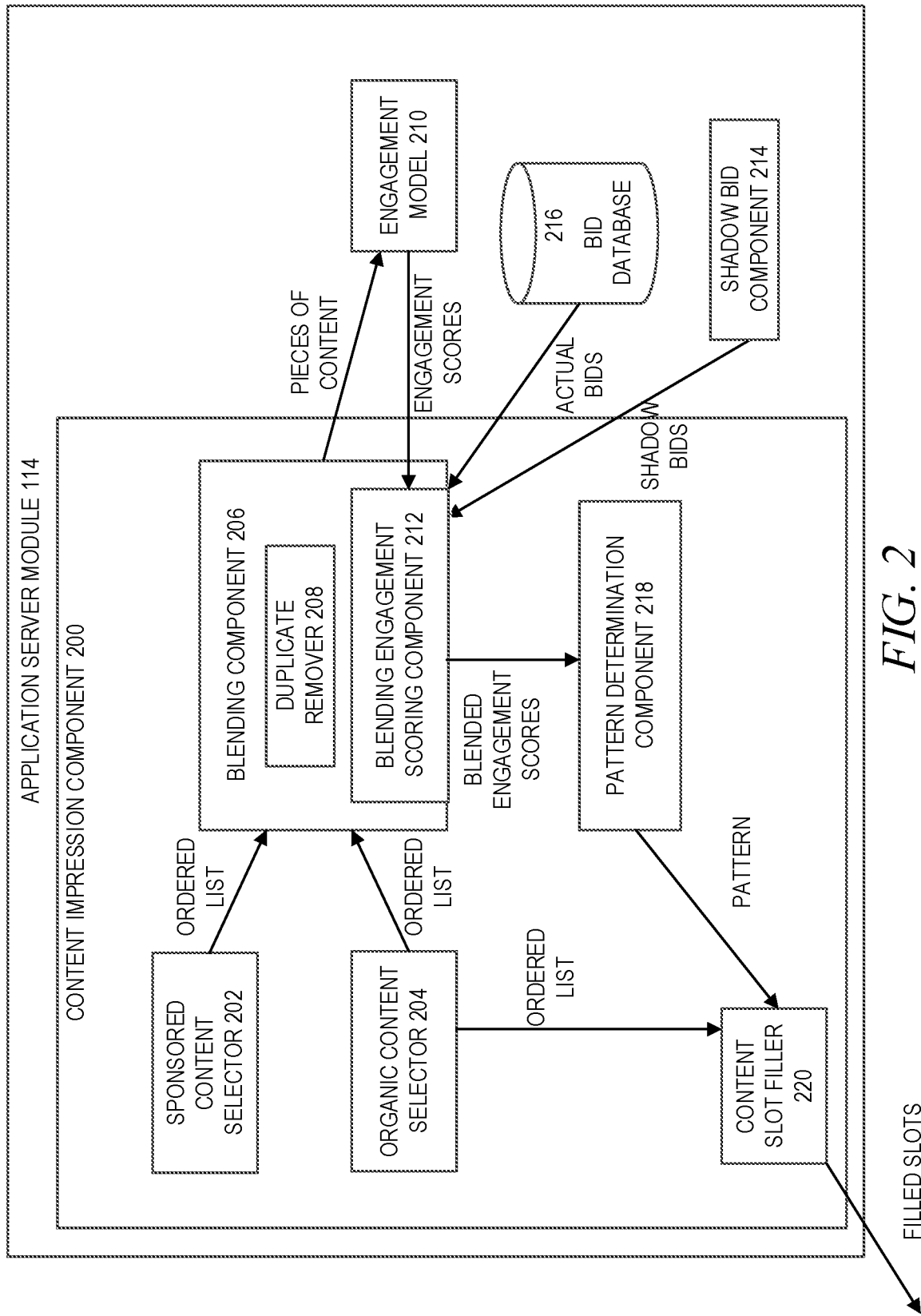
FIG. 2 is a block diagram illustrating an application server module of FIG. 2 in more detail, in accordance with an example embodiment.

FIG. 2 is a block diagram illustrating application server module 114 of FIG. 1 in more detail, in accordance with an example embodiment. While in many embodiments the application server module 114 will contain many subcomponents used to perform various different actions within the social networking system 110, in FIG. 2 only those components that are relevant to the present disclosure are depicted.

A content impression component 200 may receive, at runtime, one or more job listings and determine which users of the online network to present the job listings to as "impressions". An impression is a single display of the job listing in a graphical user interface. There may be numerous ways these impressions may be presented and numerous channels on which these impressions may be presented. For example, the impressions may be presented in an email to a user, in a feed of the online network, or as results of a job search. Some of these impressions may be for job listings where the corresponding entity that posted the job listing has agreed to pay for the impression. Such impressions are called "sponsored impressions". It should be noted that there is a distinction between the corresponding entity having agreed to pay for the impression and the corresponding entity actually paying for the impression. It is possible that the entity may have agreed to pay for an impression but, at the time the impression is made, the daily budget established by the entity has been used up, and thus it becomes possible for the sponsored impression to be displayed without an actual charge being applied to the entity's account.

More particularly, companies may establish a daily budget they want to spend and a cost per impression based on a predicted number of impressions that they believe will occur each day. The actual display of the job listings, however, are based on a variety of factors that may vary based on the individual sets of users potentially served the job listing on a particular day.

All of these determinations may be considered by a sponsored content selector 202, which may consider information about the current user (i.e., the user for whom the piece(s) of content are being considered for display), the channel in which the display may occur, and the content itself (such as how closely features of the content match attributes of the user, or what the user is searching for (e.g., a search query submitted by the user)) to identify an ordered list of sponsored pieces of content available for display to the user in the channel. In this context, "channel" refers to a type of user interface or portion of a user interface on which content may be displayed. For example, a social networking service may provide multiple user interfaces or portions of user interfaces where job listings may be displayed to a user, including a job search channel (where users perform explicit searches for job listings, such as by specifying a job search query), a jobs-you-may-be-interested-in channel (where job listings are presented to a user who has not performed an explicit search, based on information the social networking service knows about the user), an email channel (where job listings are presented in emails rather than as part of a web-based user interface), and a feed channel (where job listings are presented as part of a content feed), where other types of feed content, such as news articles and updates about the user's connections, are intermingled.

In an example embodiment, the sponsored content selector 202 implements a model that determines the ordered list of sponsored pieces of content, possibly from the features described above. In some example embodiments, this model may be a machine learned model that is trained by a machine learning algorithm. The training may include using training data, such as labeled pieces of content, to learn one or more weights assigned to each of one or more features, such as user features, content features, and channel features. In an example embodiment, the machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, the model implemented by the sponsored content selector 202 bases its selection on a combination of the relevance of the sponsored pieces of content to the user and/or the search performed by the user and how efficiently displaying each of the sponsored pieces of content will utilize the budgets set for the sponsored pieces of content by the job posters.

Regardless of how it is determined, the sponsored content selector 202 outputs an ordered list of sponsored pieces of content.

Separately, an organic content selector 204 identifies an ordered list of organic pieces of content available for display to the user in the channel. This may be performed using, for example, information about the current user, the channel in which the display may occur, and the content itself (such as how closely features of the content match attributes of the user, or what the user is searching for (e.g., a search query submitted by the user). The organic pieces of content may be pieces of content posted by job posters who have not elected to sponsor the pieces of content.

In an example embodiment, the organic content selector 204 implements a model that determines the ordered list of organic pieces of content, possibly from the features described above. In some example embodiments, this model may be a machine learned model that is trained by a machine learning algorithm. The training may include using training data, such as labeled pieces of content, to learn one or more weights assigned to each of one or more features, such as user features, content features, and channel features. In an example embodiment, the machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, the model implemented by the organic content selector 204 bases its selection on the relevance of the organic pieces of content to the user and/or the search performed by the user.

The ordered list of sponsored pieces of content and the ordered list of organic pieces of content are then passed to a blending component 206. The first thing the blending component 206 may do is remove any duplicate pieces of content using a duplicate remover 208. Unlike pure advertisements, sponsored pieces of content only vary from organic pieces of content by virtue of their respective poster being willing to pay for an impression. Thus, it is possible for a piece of content, such as a job listing, to be both sponsored and organic. This situation can arise, for example, if a company is willing to pay a social networking service to have an impression of the job posting be displayed in results on the social network service, but where the company has also posted the same job posting on a third-party web site which is crawled by the social networking service to obtain job listings which are unpaid. In an example embodiment, if the same piece of content exists in both the ordered list of sponsored pieces of content and the ordered list of organic pieces of content, the duplicate remover 208 removes that piece of content from the ordered list of organic pieces of content. In another example embodiment, if the same piece of content exists in both the ordered list of sponsored pieces of content and the ordered list of organic pieces of content, the lower ranked piece of content is removed. This latter example embodiment may involve the duplicate remove 208 being contained within the content slot filler 220, as the de-duplication would occur during the slotting of specific jobs to the slotting pattern, dropping any jobs that were already seen and slotted earlier, to arrive at the final output.

The blending component then passes each piece of content on each of the lists through an engagement model 210, which outputs a predicted engagement score for each piece of content. In an example embodiment, the predicted engagement score is a predicted click-through rate for the piece of content for the current user (and, if appropriate, the current channel being examined). Click-through rate is a metric indicating the number of clicks (i.e., user interface selections) of the piece of content versus the number of impressions of the piece of content. Essentially it is a score indicative of the likelihood that the user will select the piece of content if it is presented to the user. While click-though rate is one example of such a predicted engagement score, there are other examples as well, such as ones that factor in other types of engagement than merely selecting (such as sharing, saving for later, dwelling on, etc.), or ones that deal with even more specific types of engagement (such as applying for a corresponding job). Thus, generally speaking, the predicted engagement score is indicative of the likelihood that the user will engage with the piece of content in some manner that is determined to be important by the entity operating the blending component 206.

Notably, in an example embodiment, the same engagement model 210 is used to score pieces of content from both the ordered list of sponsored pieces of content and the ordered list of organic pieces of content, in contrast with, for example, scoring these pieces of content using different models. This eliminates the need to calibrate the scores as one would need to do if multiple different models were used. Such calibration can be technically challenging in certain environments, such as where the ranking models used to rank the ordered list of sponsored pieces of content and/or the ordered list of organic pieces of content are learning to rank (LTR) models and the scores are challenging to calibrate across models.

The engagement scores are used by a blending engagement scoring component 212 to determine a blended engagement score for each piece of content from the ordered list of sponsored pieces of content and the ordered list of organic pieces of content. This blended engagement score is based on both the engagement score for the corresponding piece of content and a bid for the piece of content. In the case of a sponsored piece of content, the bid is the value for the impression of the sponsored piece of content that the poster of the sponsored piece of content is willing to pay (as discussed above it is possible that in certain scenarios the job poster is willing to pay a particular amount but the actual impression itself will wind up costing the job poster less, or even nothing, if, for example, the daily budget has already been exceeded). In the case of an organic piece of content, the bid is a shadow bid, which is a value assigned to the organic piece of content. In an example embodiment the value of the shadow bid indicates a value of user engagement generally with the pieces of content in the user interface, such as the value to a social networking service operating the content impression component 200. This value may be reflective of an actual monetary value of such engagement with organic pieces of content, such as by advertisements placed elsewhere in the user interface (i.e., outside of the sponsored pieces of content), or may be reflective of an assumed monetary value of more nebulous value drivers, such as increases in subscriptions, or the driving of additional sponsored listings to the system.

In some example embodiments, the shadow bid is determined by a machine learned model that is trained by a machine learning algorithm to output a value for the corresponding piece of content based on various factors. The machine learned model is trained by a machine learning algorithm. The training may include using training data, such as labeled pieces of content, to learn one or more weights assigned to each of one or more features, such as user features, content features, and channel features. In an example embodiment, the machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

In some example embodiments, the shadow bid may be personalized. Users may react differently to sponsored slots. Some users engage more with sponsored slots, and others with organic slots. Some users consider sponsored slots to be ads to be ignored, while others consider sponsored slots to be personalized recommendations to be engaged with. Since the usefulness of the shadow bid itself is dependent on its comparison with an actual bid of a sponsored piece of content, the higher the tolerance for sponsored pieces of content a user has, the lower the shadow bid should be set.

The position in the ordered list of organic pieces of content may also be relevant to the value set for the shadow bid. Higher positions, for example, may be assigned higher shadow bids so that sponsored pieces of content need to be even more relevant, or pay even more, to be shown at the top of the display.

The shadow bids may be retrieved from a shadow bid component 214, while the actual bids may be obtained from a bid database 216. The blending engagement scoring component 212 may then compute a blended engagement score for each piece of content from the ordered list of sponsored pieces of content and the ordered list of organic pieces of content. In an example embodiment, the following formulas are used for pieces of content in the list of sponsored pieces of content and the list of organic pieces of content, respectively:

| Sponsored slots | $S_{m,j,t} = \text{pctr}_{m,j} * \text{bid}_{j,t}$ |
| Organic slots | $S_{m,j} = \text{pctr}_{m,j} * \lambda$ | where S is the score, pctr is a predicted engagement score, bid is an actual bid, $\lambda$ is a shadow bid, m is a user, j is a piece of content, and t is time.

The blended engagement scores are then passed to a pattern determination component 218. The pattern determination component 218 ranks the pieces of content (from both lists combined) based on their respective blended engagement scores, subject to one or more constraints. In some example embodiments this is implemented by first ranking the pieces of content based on their respective blended engagement scores and then adjusting this ranking to satisfy the constraints. In other example embodiments, this is implemented by including the one or more constraints when determining the ranking initially.

The one or more constraints may be set to improve user experience. One such constraint may be a maximum number of sponsored pieces of content at the top of the display area (i.e., no more than X sponsored pieces of content may be at the top of the ranking). Another such constraint may be a maximum number of consecutive sponsored pieces of content (i.e., no more than Y sponsored pieces of content consecutively in the ranking). Another such constraint may be a minimum gap between two blocks of sponsored pieces of content. This constraint utilizes another parameter, B, which defines a block size for sponsored pieces of content. Thus, the constraint may indicate that at least X organic pieces of content must appear consecutively after any block of B sponsored pieces of content in the ranking. Another such constraint may be a total maximum number of sponsored pieces of content in a displayed page (of some set number of slots). Another such constraint may be a minimum number of organic pieces of content at the top of the ranking. Another such constraint may be a maximum number of sponsored pieces of content from any one job poster/company per page.

Once the pieces of content from both lists combined have been ranked in a way that meets the one or more constraints, the ranking defines a pattern. The pattern is an indication of slot assignments, namely which slots in the ranking are assigned to sponsored pieces of content and which slots in the ranking are assigned to organic pieces of content. This pattern may then be used to display the actual pieces of content to the user, albeit in a different order than the ranking itself suggests for individual pieces of content. In other words, the pattern is used to determine whether a particular slot is going to be assigned to display a sponsored piece of content or an organic piece of content, but not to determine which actual piece of content to display in the slot.

More particularly, the pattern is then passed to a content slot filler 220, which actually fills the assigned slots with content, in accordance with the pattern, but using a ranking that is different than the ranking determined by the pattern determination component. In an example embodiment, the content slot filler 220 uses the order in the ordered list of sponsored pieces of content from the sponsored content selector 202 to determine which pieces of content to fill the sponsored content slots in the pattern with, and uses the order in the ordered list of organic pieces of content from the organic content selector 204 to determine which pieces of content to fill the organic content slots in the pattern with. In some example embodiments, alternative ordering are utilized. For example, the content slot filler 220 may re-rank the organic pieces of content according to its own model.

Figure 3:
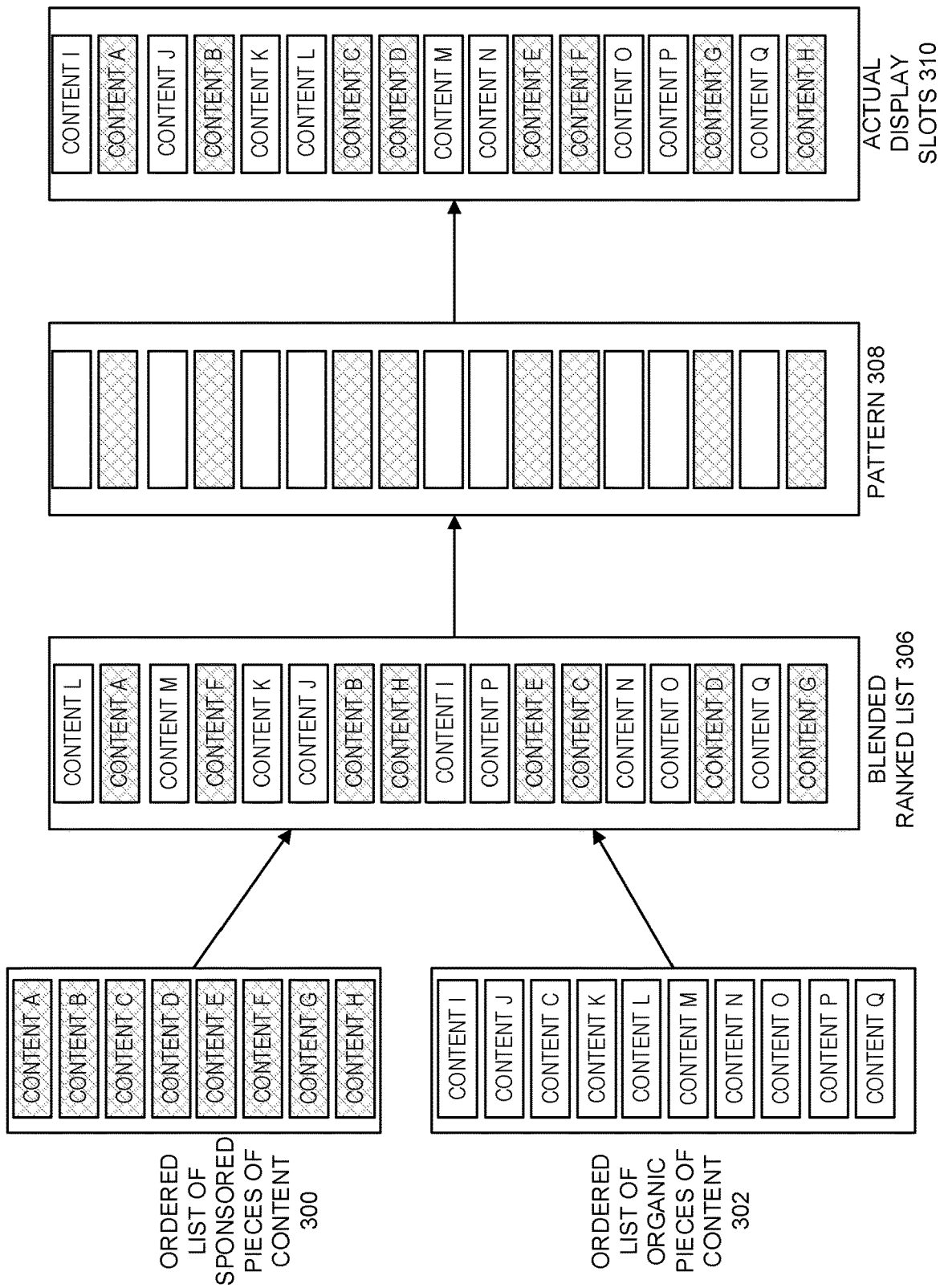
FIG. 3 is a diagram illustrating an example of dynamic slotting, in accordance with an example embodiment.

FIG. 3 is a diagram illustrating an example of dynamic slotting, in accordance with an example embodiment. The ordered list of sponsored pieces of content 300 includes eight sponsored pieces of content in a first order, while the ordered list of organic pieces of content 302 includes ten organic pieces of content in a second order. The sponsored pieces of content are shaded, while the organic pieces of content are not. Notably, there is one piece of content (Content C) that is present in both lists. This duplicate piece of content may be removed from the ordered list of organic pieces of content 302, leaving nine organic pieces of content. These lists are then merged and ranked, using engagement scores and actual bids for the sponsored pieces of content and engagement scores and shadow bids for the organic pieces of content, and subject to one or more constraints. The result is blended ranked list 306. The pattern 308 is then determined by looking at each slot in the ranking and seeing if the corresponding piece of content in the slot is sponsored or organic. If the corresponding piece of content in the slot is sponsored, the slot is assigned to sponsored, while if the corresponding piece of content in the slot is organic, the slot is assigned to organic. The original ordering in the ordered list of sponsored pieces of content 300 and the original ordering in the ordered list of organic pieces of content 302 is then used to fill in actual display slots 310 (subject to an upper limit on the number of slots that can be displayed at any one time, based on the device or device class being used, for example). Example device classes include web browser, desktop application, and mobile application. Notably, this results in some pieces of content being displayed at slots different than reflected in the blended ranked list 306, albeit still in the slots assigned to either sponsored or organic pieces of content as per the pattern 308.

As described earlier, the pattern determination component 218 ranks the pieces of content (from both lists combined) based on their respective blended engagement scores, subject to one or more constraints. In an example embodiment, the constraints may be applied using a finite state machine. More particularly, when there is more than one constraint, the ordering of how the constraints are applied may affect the results of the ranking, and thus the final pattern. In an example embodiment, the following constraints may be utilized: (1) maximum number of sponsored pieces of content at the top of the display area; (2) maximum number of sponsored pieces of content from any one job poster/company per page; (3) minimum number of organic pieces of content at the top of the display area; (4) maximum number of consecutive sponsored pieces of content; and (5) minimum gap between two blocks of sponsored pieces of content. The constraints may be applied in the order from (1) to (5), although (3)-(5) do not potentially conflict with each other and thus could be applied in any order amongst themselves.

In a finite state machine, a state is a description of the status of a system that is waiting to execute a transition. A transition is a set of actions to be executed when a condition is fulfilled or when an event is received. In some finite state machine representations, it is also possible to associate actions with a state.

In an example embodiment, the event triggering the transition is a need to determine a next slot in the pattern with a piece of content from the ordered list of sponsored pieces of content and the ordered list of organic pieces of content. When there is only one piece of content left, either organic or sponsored, the next state will be the end state, in which case the remaining piece of content is simply appended to the ranked list.

Figure 4:
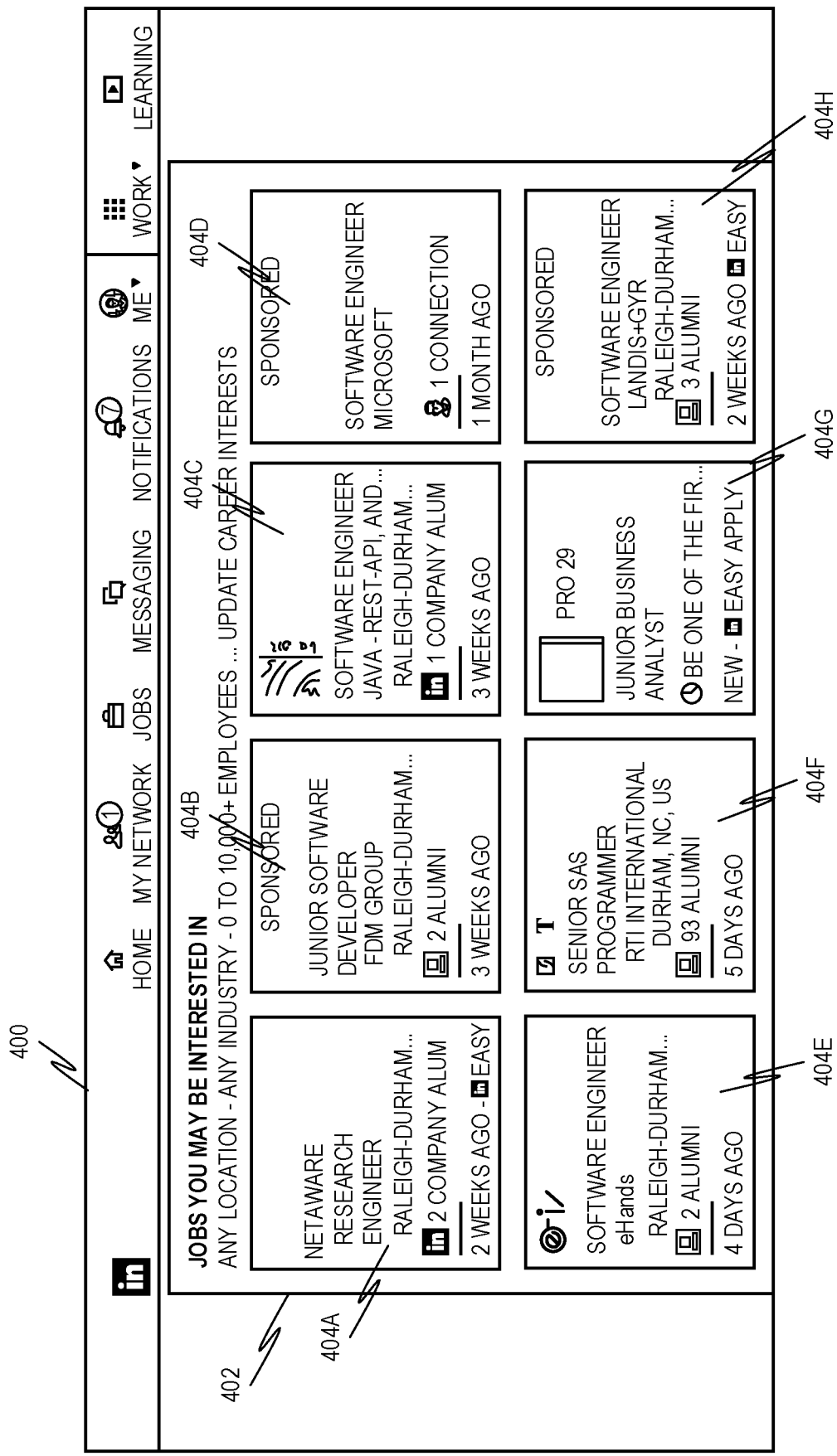
FIG. 4 is a diagram illustrating a screen capture of a job listing user interface in accordance with an example embodiment.

FIG. 4 is a diagram illustrating a screen capture of a job listing user interface 400 in accordance with an example embodiment. Here, the user interface 400 is a web page presented in a web browser. The job listing user interface 400 includes a portion 402 set aside where recommended job listings are presented. The job listing user interface 400 is part of the jobs-you-may-be-interested-in channel. Here, there are spaces for eight job listings per page, and the pattern has indicated that the $2^{nd}$, $4^{th}$, and $8^{th}$ slots (as read left-to-right and then top-to-bottom) are sponsored slots. As such, the job listings 404B, 404D, and 404H are sponsored job listings, while the remaining job listings 404A, 404C, 404E, 404F, and 404G are organic job listings.

It should be noted that FIG. 4 is merely one example of a job listing user interface 400, and the design and layout of the job listing user interface 400 may vary greatly from implementation to implementation. More particularly, the number and layout of the presented job listings may also vary. Furthermore, in some example embodiments, rather than having the job listings presented in strictly defined pages, they are presented using an infinite scrolling technique, where a user can see more and more listings by scrolling down in the display rather than needing to skip to a separate page of listings. The techniques described above would be equally applicable to the infinite scrolling embodiment, with the exception that constraints tied to pages would need to be reformulated so that the entirety of the job listings are considered as one large page.

In another example embodiment, the job listing user interface 400 may be presented on a mobile device, either in a web browser operating on the mobile device or in a stand-alone application ("app"). Notably, mobile devices often have more limited screen space, and thus the number of listings presented on any one page of the user interface may need to be more limited than in a more traditional job listing user interface intended for display on a desktop or laptop device. The determination of the pattern in such embodiments may be at least partially dependent on the fact that the job listing user interface 400 will be displayed on a mobile device (i.e., the pattern may be different if the job listing user interface 500 is displayed on a desktop or laptop device). In some example embodiments, the size of the display may be dynamically determined at the time the pattern is being determined, to allow the pattern to be customized to the size of the display.

Figure 5:
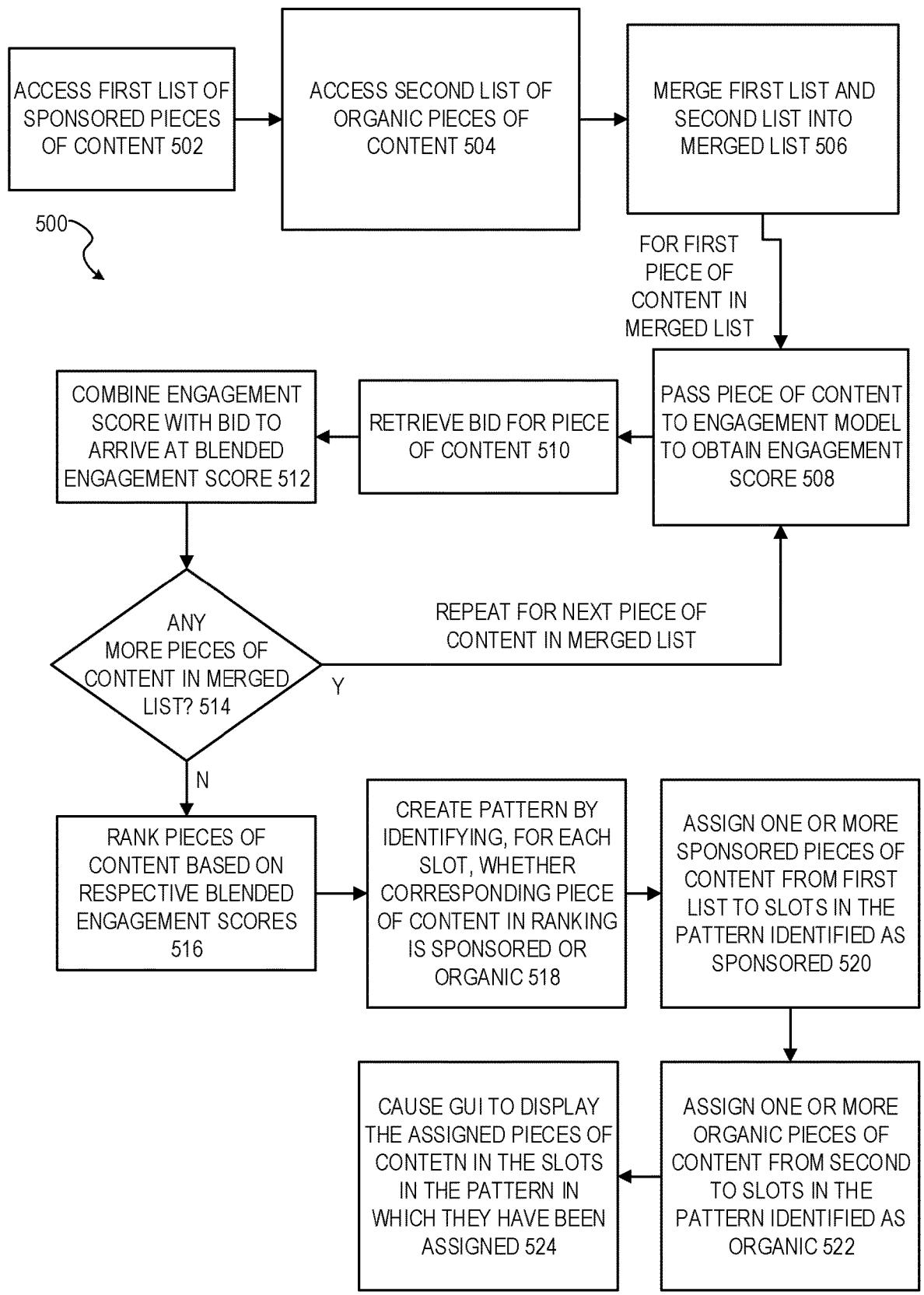
FIG. 5 is a flow diagram illustrating a method of displaying pieces of content in a graphical user interface, in accordance with an example embodiment.

FIG. 5 is a flow diagram illustrating a method 500 of displaying pieces of content in a graphical user interface, in accordance with an example embodiment. At operation 502, a first list of sponsored pieces of content is accessed. The first list is ordered in a first order. At operation 504, a second list of organic pieces of content is accessed. The second list is ordered in a second order. At operation 506, the first list and the second list are merged into a merged list. This may include removing any pieces of content from the second list that are duplicative with a piece of content in the first list.

A loop is then started to score each piece of content in the merged list. At operation 508, the corresponding piece of data is passed to an engagement model to obtain an engagement score for the corresponding piece of data. The engagement model may be trained using a machine learning algorithm to learn weights to be applied to various features, such as user features and features of the corresponding piece of data, to output an engagement score that is indicative of a likelihood that a particular user will engage with the corresponding piece of data if it is presented in a graphical user interface. At operation 510, a bid is retrieved for the corresponding piece of data. In the case of a sponsored piece of data, the bid may be contained in a bid database and may reflect the price a job poster is willing to pay for an impression (i.e., a single display in the graphical user interface) of the sponsored piece of data. In the case of an organic piece of data, the bid may be a shadow bid assigned to the organic piece of data, which is indicative of a value of an impression, such as a value to the entity that operates the system that outputs the pieces of data in the graphical user interface. The shadow bid may be a global shadow bid, applied to all organic pieces of data, or may be personalized based on user, slot, or other features.

At operation 512, the engagement score is combined with the bid to arrive at a blended engagement score for the corresponding piece of data. This combining may be a multiplication. At operation 514, it is determined if there are any more pieces of content in the merged list. If so, then the method 500 loops back to operation 508 for the next piece of content in the merged list.

If not, then at operation 516, the pieces of content in the merged list are ranked based on their respective blended engagement scores. This results in the merged list having organic pieces of content ranked in a third order different than the second order. This ranking may be constrained by one or more constraints. Examples of such constraints were discussed in detail earlier in this document.

At operation 518 a pattern for display of pieces of content is created by identifying, at each slot in the ranking of the plurality of pieces of content, whether the corresponding piece of content in the ranking is sponsored or organic, and indicating that identification at each corresponding slot in the pattern. Thus the pattern becomes a series of slots, with each slot identified as either sponsored or organic. At operation 520, one or more sponsored pieces of content from the first list are assigned to slots in the pattern that have been identified as sponsored. This assigning may or may not be in the same order as they are ranked during the ranking based on the blended engagement scores. At operation 522, one or more organic pieces of content from the second list are assigned to slots in the pattern that have been identified as organic. The assigning the organic pieces of content is in a different order than they were ranked during the ranking based on the blended engagement core. In other words, this assignment is in a fourth order different than the third order. In some example embodiments, the fourth order is the same as the second order.

At operation 524, the graphical user interface is caused to display the assigned one or more sponsored pieces of content and the assigned one or more organic pieces of content in the slots in the pattern in which they have been assigned.

Figure 6:
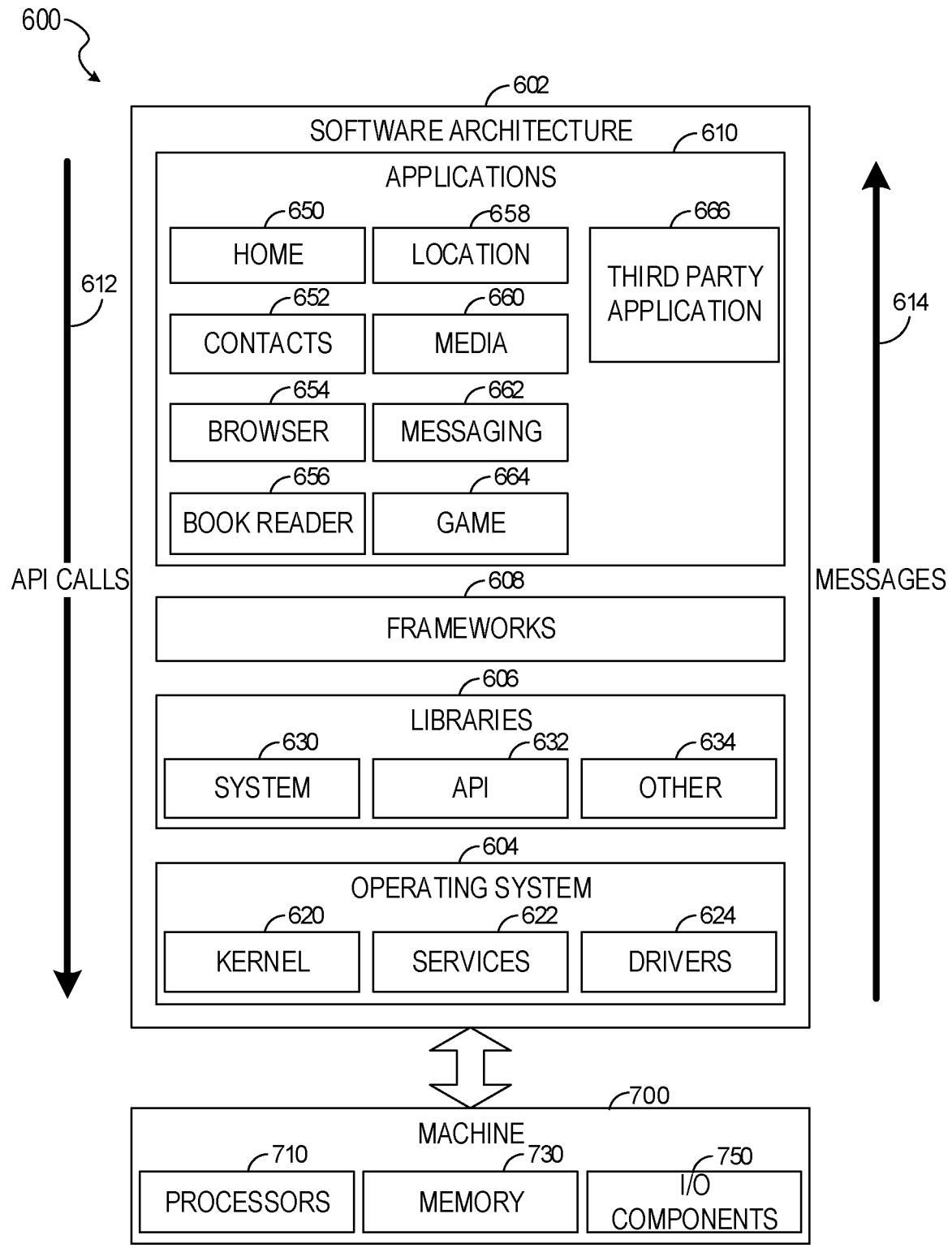
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 900 of FIG. 9 that includes processors 910, memory 930, and input/output (I/O) components 950. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application 610, an applet, an app, or other executable code) for causing the machine 700 to perform any one or more of the methodologies discussed herein may be executed. For example, the instructions 716 may cause the machine 700 to execute the method 700 of FIG. 7. Additionally, or alternatively, the instructions 716 may implement FIGS. 1-7, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

Figure 7:
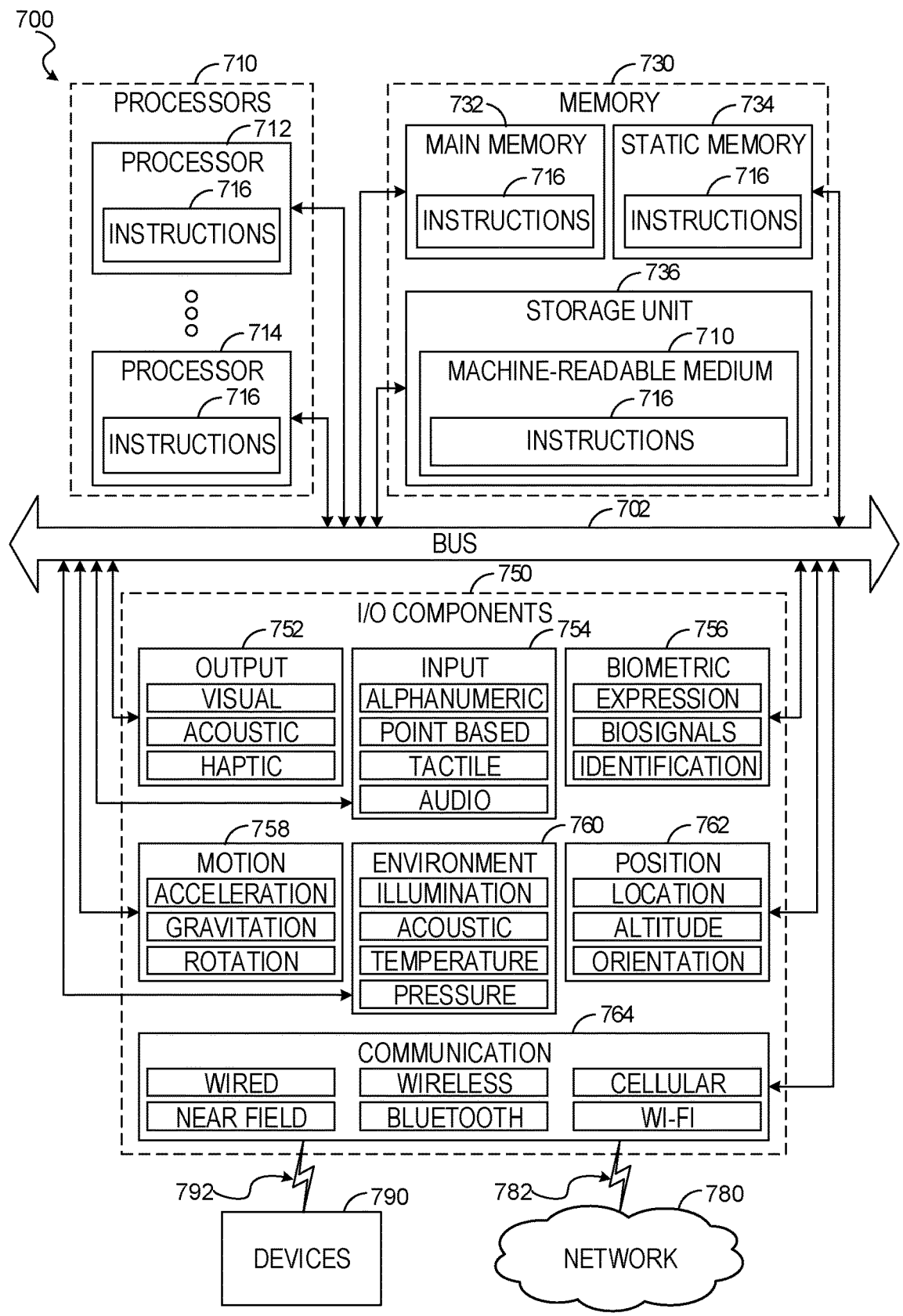
FIG. 7 illustrates a diagrammatic representation of a machine in the form of a computer system within which a set of instructions may be executed for causing the machine to perform any one or more of the methodologies discussed herein, according to an example embodiment.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 790 via a coupling 782 and a coupling 792, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 790 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 792 (e.g., a peer-to-peer coupling) to the devices 790. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a non-transitory computer-readable medium having instructions stored thereon, which, when executed by a processor, cause the system to perform operations comprising:
accessing a first list of sponsored pieces of content, the first list ordered in a first order;
accessing a second list of organic pieces of content, the second list ordered in a second order;
merging the first list and the second list into a merged list including a plurality of pieces of content;
calculating blended engagement scores for the plurality of pieces of content by:
passing the plurality of pieces of content to an engagement model, the engagement model being a machine-learned model trained by a machine learning algorithm to output an engagement score indicative of a likelihood that a user will engage with a corresponding piece of content if presented with the corresponding piece of content in a user interface; and
combining the engagement scores for the plurality of pieces of content with bids to arrive at blended engagement scores for the plurality of pieces of content;
ranking the plurality of pieces of content using a first ranking algorithm, based on their respective blended engagement scores, resulting in the plurality of pieces of content having organic pieces of content ranked in a third order different than the second order;
creating a pattern for display of the pieces of content by indicating, at each slot in the pattern, whether the corresponding piece of content in the ranking of the plurality of pieces of content is sponsored or organic;
assigning one or more sponsored pieces of content, from the first list to slots in the pattern, that have been identified as sponsored;
assigning one or more organic pieces of content, from the second list to slots in the pattern, that have been identified as organic, the assigning the organic pieces of content in a fourth order different than the third order, the fourth ordering created using a second ranking algorithm different than the first ranking algorithm; and
causing display, in a graphical user interface, of the assigned one or more sponsored pieces of content and the assigned one or more organic pieces of content in the slots in the pattern in which they have been assigned.

2. The system of claim 1, wherein for sponsored pieces of content the bid is an amount a content poster has agreed to pay for an impression of the corresponding sponsored piece of content.

3. The system of claim 1, wherein for organic pieces of content the bid is a shadow bid indicative of a hypothetical value of an impression of the corresponding organic piece of content.

4. The system of claim 1, wherein the merging comprises removing any pieces of content in the second list that are duplicative with a piece of content in the first list.

5. The system of claim 1, wherein the fourth order is the same as the second order.

6. The system of claim 1, wherein the ranking comprises ranking in accordance with one or more constraints on placement locations for sponsored and/or organic pieces of content.

7. The system of claim 6, wherein the one or more constraints include a maximum number of consecutive sponsored pieces of content beginning at a highest slot of a display area.

8. The system of claim 6, wherein the one or more constraints include a maximum number of consecutive sponsored pieces of content.

9. The system of claim 6, wherein the one or more constraints include a minimum gap between two blocks of a set block size number of sponsored pieces of content.

10. The system of claim 6, wherein the one or more constraints include a total maximum number of sponsored pieces of content in a displayed page.

11. The system of claim 6, wherein the one or more constraints include a minimum number of consecutive organic pieces of content beginning at a highest slot of a display area.

12. The system of claim 6, wherein the one or more constraints include a maximum number of sponsored pieces of content from any one job poster or company per page.

13. The system of claim 1, wherein the pieces of content are job listings.

14. The system of claim 1, wherein the pattern is dependent on a device on which the graphical user interface is rendered.

15. The system of claim 1, wherein the pattern is dependent on a channel on which the sponsored and organic pieces of content are to be displayed.

16. The system of claim 1, wherein the engagement model is trained using training data regarding user features of a plurality of users and outputs engagement scores based on user features for a user of the graphical user interface.

17. The system of claim 1, wherein the engagement scores are predicted click-through rates.

18. A computerized method comprising:
accessing a first list of sponsored pieces of content, the first list ordered in a first order;
accessing a second list of organic pieces of content, the second list ordered in a second order;
merging the first list and the second list into a merged list including a plurality of pieces of content;
calculating blended engagement scores for the plurality of pieces of content by:
passing the plurality of pieces of content to an engagement model, the engagement model being a machine-learned model trained by a machine learning algorithm to output an engagement score indicative of a likelihood that a user will engage with a corresponding piece of content if presented with the corresponding piece of content in a user interface; and
combining the engagement scores for the plurality of pieces of content with bids to arrive at blended engagement scores for the plurality of pieces of content;
ranking the plurality of pieces of content using a first ranking algorithm, based on their respective blended engagement scores, resulting in the plurality of pieces of content having organic pieces of content ranked in a third order different than the second order;
creating a pattern for display of the pieces of content by indicating, at each slot in the pattern, whether the corresponding piece of content in the ranking of the plurality of pieces of content is sponsored or organic;
assigning one or more sponsored pieces of content, from the first list to slots in the pattern, that have been identified as sponsored;
assigning one or more organic pieces of content, from the second list to slots in the pattern, that have been identified as organic, the assigning the organic pieces of content in a fourth order different than the third order, the fourth ordering created using a second ranking algorithm different than the first ranking algorithm; and
causing display, in a graphical user interface, of the assigned one or more sponsored pieces of content and the assigned one or more organic pieces of content in the slots in the pattern in which they have been assigned.

19. A system comprising:
means for accessing a first list of sponsored pieces of content, the first list ordered in a first order;
means for accessing a second list of organic pieces of content, the second list ordered in a second order;
means for merging the first list and the second list into a merged list including a plurality of pieces of content;
means for calculating blended engagement scores for the plurality of pieces of content by:
passing the plurality of pieces of content to an engagement model, the engagement model being a machine-learned model trained by a machine learning algorithm to output an engagement score indicative of a likelihood that a user will engage with a corresponding piece of content if presented with the corresponding piece of content in a user interface; and
combining the engagement scores for the plurality of pieces of content with bids to arrive at blended engagement scores for the plurality of pieces of content;
means for ranking the plurality of pieces of content using a first ranking algorithm, based on their respective blended engagement scores, resulting in the plurality of pieces of content having organic pieces of content ranked in a third order different than the second order;
means for creating a pattern for display of the pieces of content by indicating, at each slot in the pattern, whether the corresponding piece of content in the ranking of the plurality of pieces of content is sponsored or organic;
means for assigning one or more sponsored pieces of content, from the first list to slots in the pattern, that have been identified as sponsored;
means for assigning one or more organic pieces of content, from the second list to slots in the pattern, that have been identified as organic, the assigning the organic pieces of content in a fourth order different than the third order, the fourth ordering created using a second ranking algorithm different than the first ranking algorithm; and
means for causing display, in a graphical user interface, of the assigned one or more sponsored pieces of content and the assigned one or more organic pieces of content in the slots in the pattern in which they have been assigned.

* * * * *